July 17, 1951     W. F. BELL     2,561,092
ROTOR IMPREGNATING MACHINE
Filed Dec. 22, 1947     3 Sheets-Sheet 1

Inventor
William F. Bell
Attorneys

July 17, 1951 W. F. BELL 2,561,092
ROTOR IMPREGNATING MACHINE
Filed Dec. 22, 1947 3 Sheets-Sheet 3

Inventor
William F. Bell
By Spencer Willits, Helwig & Baillio
Attorneys

Patented July 17, 1951

2,561,092

UNITED STATES PATENT OFFICE 2,561,092

ROTOR IMPREGNATING MACHINE

William F. Bell, Western Springs, Ill., assignor to General Motors Corporation, Detroit, Mich., a corporation of Delaware Application December 22, 1947, Serial No. 793,126

10 Claims. (Cl. 91—55)

The present invention relates to impregnation of electrical machinery with insulating material and more particularly to automatic apparatus for impregnating electrical machinery.

The principal object of the invention is to provide manually preset and started automatic apparatus for controlling the duration of rotation and heating a dynamo-electric machine element and for applying a heat drying or baking varnish to the heated rotating element thereby to insure proper uniform heating of the element, proper uniform varnish penetration and uniform baking of the varnish applied to the element.

The combined apparatus by which this object is accomplished will become apparent by reference to the following detailed description and drawings illustrating one form of the apparatus which is particularly adapted for impregnating armatures for dynamo-electric machines.

Figure 1 of the drawings is a vertical side elevation of the apparatus with certain parts broken away and in section to show certain details more effectively.

Figure 1:
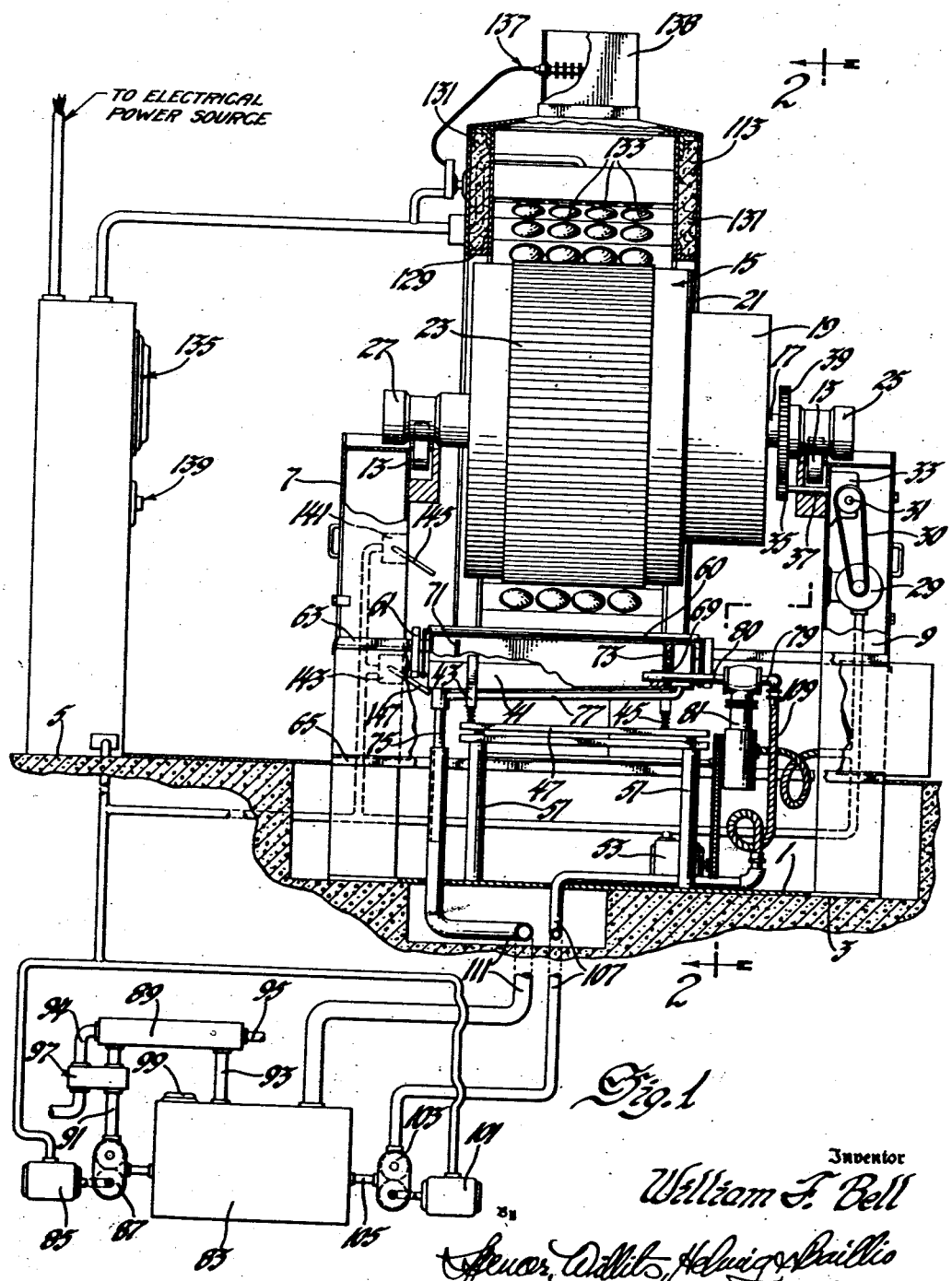
Figure 2:
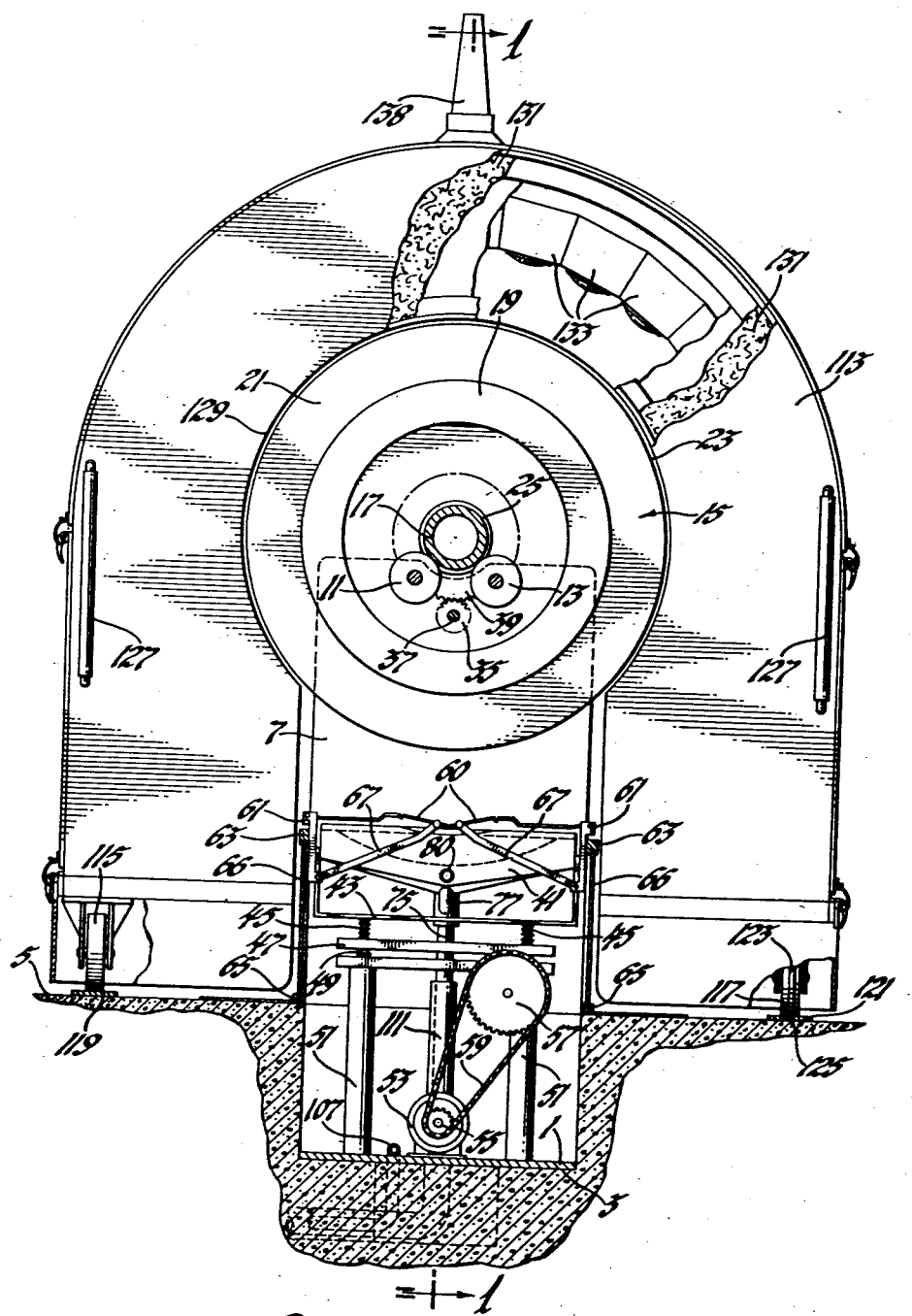
Figure 2 is a vertical end elevation view of the apparatus shown in Figure 1 with parts broken away and in section.
Figures 3, 4:
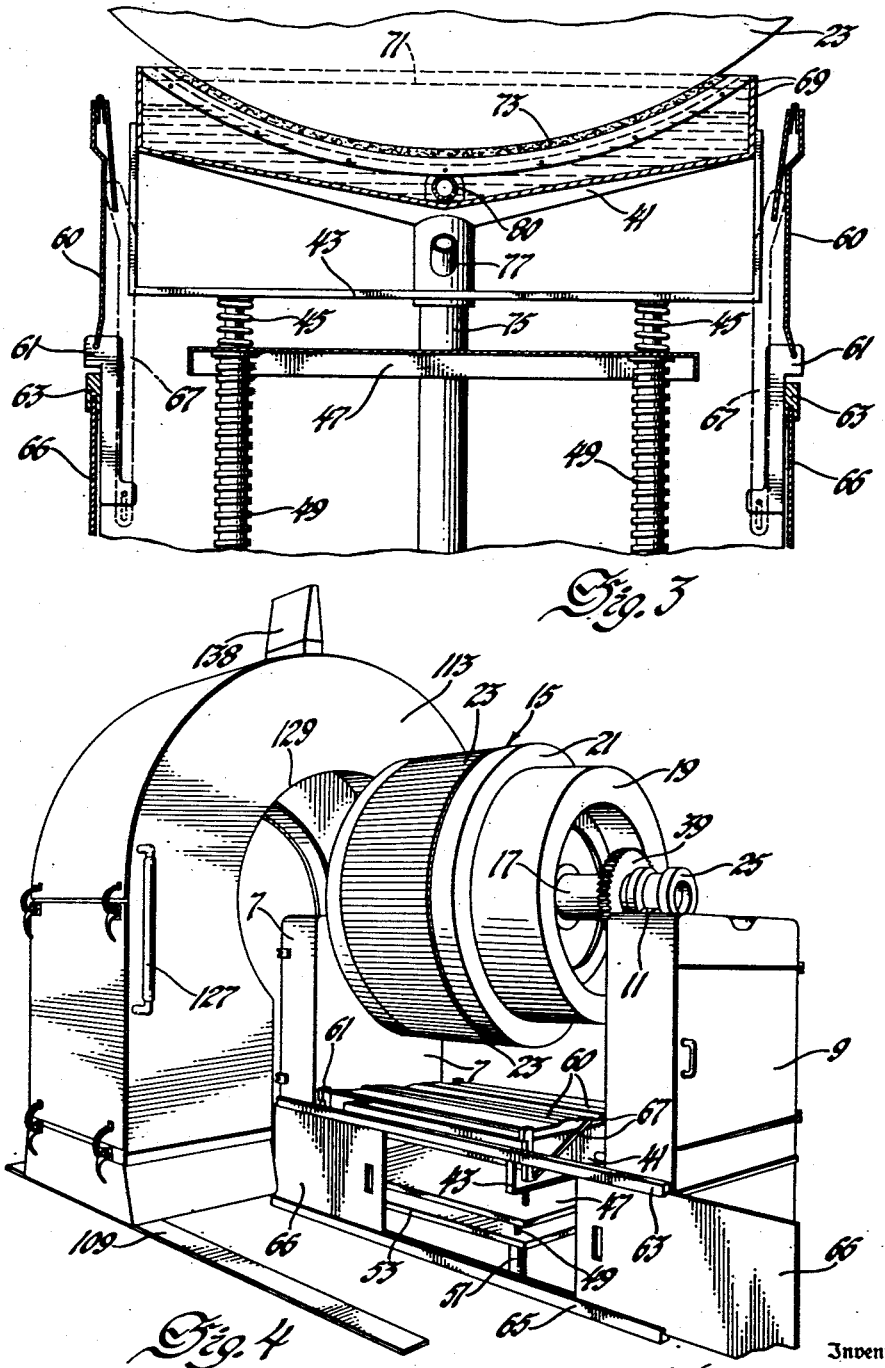
Figure 3 is an enlarged view taken on line 3—3 of Figure 1 showing certain of the parts broken away and in section to show further details.
Figure 4 is a perspective view of the automatic means with the elements in position for loading and unloading of the dynamo-electric machine element processed thereby.

As best illustrated in Figures 1, 2 and 4 the combined apparatus comprises a base 1 secured in a depressed portion 3 of a floor 5. Upright end support members 7—9 are secured to the base 1 and a pair of rollers 13 are mounted for rotation about parallel horizontal axes on the top of each of the members 7—9. The dynamo-electric machine element illustrated is an armature generally indicated at 15 having a shaft 17, a commutator 19 having a riser portion 21 and a larger diameter core portion 23 having formed, insulated electrical conductors imbedded in longitudinal slots in a periphery of the core and electrically connected at one end to the commutator riser portion in conventional manner. Adapters 25—27 are secured on opposite ends of the armature shaft 17 and each adapter is shown provided with an annular groove portion in engagement with one pair of rollers on each of the support members 7—9.

Means comprising a motor 29 secured to the end support member 9 and operatively connected by a belt 30 to the input shaft 31 of a reduction gear unit 33, also secured to the support member 9 and having a pinion 35 on the output shaft 37 meshing with a driven gear portion 39 formed on the armature shaft adapter 25 serves to cause rotation of the armature about its horizontal shaft axis at slow speed relative to the end support rollers 13.

As best illustrated in Figures 1, 3 and 4, a varnish dip tank 41 for the armature 15 is supported for vertical movement by brackets 43 resting on springs 45 supported adjacent the corners of a table 47 which is supported on the vertically movable elements 49 of four screw jacks 51 secured to the base member 1 between the uprights 7—9. These jacks are operated simultaneously by suitable jack operating means including a motor 53 supported on the base member 1 and driving this jack operating means through sprockets 55—57 and a chain 59. The dip tank 41 is accordingly supported by means of springs 45 on the table 47 and the table and tank are elevated from the fully depressed position, as shown in Figures 1, 2 and 4, to a fully elevated position, as shown in Figure 3, upon rotation of the motor 53 and jack operating mechanism in one direction. Conversely, rotation of this means in the opposite direction causes downward movement of the table and tank. It will be seen in Figure 3 that with the dip tank in the fully elevated position only the lower portion of the armature core portion 23 is within the dip tank 41.

A pair of two part hinged covers 60 are pivoted at the outer corners on member 61 secured adjacent the corners of the tank 41 to a pair of longitudinally extending grooved members 63 secured at the ends to each side of the end support members 7—9. Another pair of longitudinally extending grooved members 65 are secured to opposite sides of the support members below the grooved members 63 and also secured to the base member 1 on either side of the jacks 51. Panels 66 having suitable handles are slidable longitudinally in these grooved members 63—65 to provide convenient access to the tank, jacks and jack operating mechanism, as best shown in Figures 2 and 4. Tank cover guide links 67 are pivotally connected between the ends of the inner parts of the hinged covers and the members 61 so that upon elevation of the dip tank 41 the sides of the tank contact the outer parts of the hinged covers 60 and swing these parts upwardly and outwardly and the guide links 67 between the inner parts of the covers 60 and members 61 cause these inner parts to fold downwardly and outwardly so that when the tank is fully elevated the tank is completely uncovered, as best shown in Figure 3, the sides and ends of the tank then enclose only the lower core portion 23 of the armature 15. The bottom of the dip tank is of V form in cross section and slopes downwardly from the commutator end of the tank, as best shown in Figures 1 and 3. Adjacent the end walls of the dip tank transverse partitions serving as dams 69—71 are provided. The dam 69 adjacent the tank end wall at the commutator end is provided with an upper arcuate edge to which is secured a flexible sealing member 73. This sealing member 73, as best shown in Figure 3, slidably engages the lower peripheral portion of the slowly rotating armature core 23 immediately adjacent the riser portion 21 of the commutator 19 when the tank 41 is fully elevated to prevent the varnish in the tank from creeping onto the commutator 19. The other dam 71 is provided with an upper edge parallel to and at a slightly lower level than the upper edge of the adjacent tank end wall and a small spillway at the bottom, not shown. A vertical varnish drain pipe 75 extends downwardly from the center of the tank bottom located between the dam 71 and the tank end wall adjacent thereto. Another branch drain pipe 77 is connected between the drain pipe 75 and the central bottom portion of the tank 41 between the dam 69 and end wall adjacent the commutator end. Any varnish flowing over either of the end dams 69—71 accordingly flows by gravity from the ends of the tank through the drain pipes 75—77. Varnish is supplied to the dip tank through pipe connections 79—80 which include a motor operated varnish flow control valve 81. The pipe connection 80 extends in fluid tight relation through the central, lower portion end wall and dam 69 at the commutator end of the tank 41 and this connection and also the motor operated flow control valve 81 and other pipe connection 79 is movable vertically with the dip tank 41.

The following varnish conditioning and circulating means for the dip tank are connected thereto. This means includes a varnish conditioning reservoir 83 having a motor 85 driving a circulating pump 87 and heat interchanger 89 connected thereto by pipe connections 91—93 for continuously circulating varnish between the reservoir 83 and the heat interchanger 89. Hot water is supplied under pressure by means of inlet and outlet pipe connections 94—95 between the heat interchanger and a suitable source of hot water, not shown. Suitable temperature responsive control valve means, indicated generally at 97, are included in the hot water and varnish inlet connections 91—94 for maintaining the varnish, which includes a thinner or solvent, at constant temperature in a well known manner. The reservoir 83 is provided with a readily detachable cover 99 to check the viscosity of the varnish and thinner and to add thinner to replace that which is vaporized in the impregnation process. The varnish and thinner at constant temperature viscosity is supplied to the dip tank 41 by a motor 101 driving a circulating pump 103, the inlet of which is connected by a pipe 105 to the reservoir and the pump outlet is connected to a pipe 107 which is connected by a flexible hose 109 to the inlet pipe connection 79 of the dip tank 41 which as described includes the motor operated flow control valve 81 which is controlled automatically by means to be described. The vertical drain pipe 75 of the dip tank 41 is vertically movable in the larger diameter vertical portion of a return pipe 111 connected to the top of the varnish reservoir 83.

An armature heating hood 113 of generally inverted U form is supported at the corners on rollers 115—117 engaging rails 119—121 secured to the floor 5 either side of the end supports 7—9 and the dip tank 41 therebetween. The rollers 117 on one side of the hood are provided with flanges 123 which are guided in a longitudinal slot 125 in the rail 121 and handles 127 on the hood 113 provide the means for moving the hood longitudinally into or out of enclosing relation with the armature 15 and dip tank 41, the hood being provided with end openings 129 with sufficient radial clearance for the armature core 23 and side clearance for the grooved members 63—65 for the sliding panels 66 located on either side of the dip tank 41 between the end supports 7—9. The interior surface of the hood 113 is lagged with heat insulating material 131 and a plurality of heating units 133 of the infrared or near infrared type are secured to inner arcuate surface and adjacent side wall portions in concentric relation with all but the lower portion of the armature core 23 enclosed by the dip tank 41.

The time schedule of operation of the armature rotating motor 29, the heating elements 133, the motor 53 operating the dip tank 41 and the motor operated varnish flow control valve 81 may be varied as desired by providing a conventional cycle controller, shown generally at 135, having a time operated cam shaft operating a plurality of electric switches and automatic cycle reset mechanism controllers of this type are provided with a time operated disk which may be punched to preset any desired points in and the duration of the time cycle and also adjustable cams on the cam shaft to obtain any desired time schedule of operation of the above described combined apparatus and heating elements. In case of wide variations in voltage of the power supply a temperature responsive switching control device of conventional type, indicated generally at 137, is provided and is enclosed in a housing 138 shown communicating with the upper interior portion of the hood 113. The temperature responsive means 137 may be electrically connected in any convenient manner by conductors in conduits, shown in the drawings, with the cam operated switches of the cycle controller 135 and the heating elements 133 and power operated means 29, 53 and 81 and to a suitable power source in order to prevent overheating of the armature during any period in the time cycle.

A push button starting switch generally indicated at 139 is electrically connected with the cycle controller 135 in a well known manner to cause it to start and complete its manually preset time cycle schedule and to reset itself automatically to repeat this preset time schedule each time the push button 139 is depressed. Two limit switches 141—143 for the dip tank elevating and depressing motor 53 are provided with operating levers 145—147 and are secured within the support 7 at vertically spaced points, as best illustrated in Figure 1. These limit switches are shown electrically connected by suitable conductors shown in conduits extending to the motor 53. The operating lever 147 of the lower limit switch 143 is moved to the off position, as shown, upon contact of the lower portion of the dip tank 41 shortly before it is fully depressed to deenergize the motor 53 and stop downward movement of the tank in its fully depressed position. The operating lever 145 of the upper limit switch 141 is contacted by the upper portion of the dip tank 41 and moved to the off position shortly before it reaches its fully elevated position to deenergize the motor 53 and the stop upward movement of the tank 41 in its fully elevated position with the flexible seal 73 of the tank dam 69 in contact with armature core 23. When in this position the springs 45 between the tank brackets and the table 47 supported on the jacks 51 are slightly compressed to resiliently retain this seal in sealing relation with the slowly rotating armature core 23 which as previously described, prevents creepage of varnish onto the armature commutator 19 and riser portion 21.

In the use of a heat drying or baking varnish containing a suitable solvent the cycle controller 135 may be manually preset so that upon starting thereof, by depressing the push button 139, the motor 29 is energized to cause the armature 15 to be rotated slowly on the support rollers 11—13 and certain of the heating elements 133 energized from a suitable electric power source to provide a preheating period for the armature in order to bring it up to a uniform temperature, preferably above the boiling point of the solvent in the varnish in the reservoir 83, which as described, is circulated between the reservoir and the preheater 89 to maintain the varnish at constant temperature, preferably below that of the boiling point of the varnish solvent, and at constant viscosity. When the armature core 23 reaches this uniform temperature the temperature responsive switching means 137 acts to deenergize certain of the heating elements 133 and to cause the cycle controller 135 to start a heat soaking period if desired. At the end of the soaking period the cycle controller 135 then acts to start a varnish dipping period by first energizing the motor 53 to cause the dip tank 41 to be elevated. As explained shortly before the dip tank reaches the fully elevated position the arm 145 of the limit switch is moved to the off position to stop the dip tank in a position so that the flexible seal 73 on the tank dam 69 is in resilient sealing relation with the slowly rotating heated armature core portion 23 adjacent the commutator. The motor operated varnish flow control valve 81 is then energized by the cycle controller 139 or by providing a separate contact on the upper limit switch 141 to allow varnish at constant temperature and viscosity to be supplied to the dip tank 41 by means of the motor driven pump 103 connected to the reservoir in order to start the armature varnish dipping period of time sufficient to cause uniform coating and proper penetration of the varnish into the conductors of the heated armature core and the boiling away of the majority of the varnish solvent therefrom. This dipping period preferably requires one or more revolutions of the armature and in some instances certain of the heating elements 133 are also deenergized during this period by the cycle controller. The end of the dipping period takes place upon the deenergization of the motor operated flow control valve 81 to cut off the supply of varnish to the dip tank followed by reversal and energization of the motor 53 to cause the dip tank 41 to be depressed after the varnish in the dip tank has drained to the reservoir by action of the cycle controller. When the tank 41 reaches its fully depressed position it contacts the arm 147 of the lower limit switch 143 to denergize the motor 53 and stop the tank in this position. The remainder of the time cycle is a baking period after which the cycle controller deenergizes the then energized heating elements 133 and the armature driving motor 29 or if desired may be preset to repeat the above described dipping and baking periods to provide a second dip and a second bake period if desired, after which the cycle controller is automatically reset for the same cycle of operation described.

Any particular period of preheat, soak, dip and bake or the repetition of any of these periods may be obtained depending upon the setting of the cycle controller and temperature responsive means to obtain different and proper values of temperature and time periods to automatically obtain proper impregnation of different types of armatures or stators of dynamo electric machines for any particular type of heat drying varnish by use of the above described apparatus.

I claim:

1. In an impregnating machine for a workpiece, the combination of workpiece supporting bearings, power operated driving means operably connected to the workpiece for rotation thereof in the bearings, power operated heaters spaced around the workpiece to heat the outer portion of the rotating workpiece, an impregnating fluid tank movable into and out of fluid applying relation with a portion of the rotating workpiece to apply impregnating fluid to the heated portion thereof, power operated means operably connected to the tank for moving it, a source of power, power connections interconnecting the various power operated means with the power source, said power connections including time cycle power control means for controlling timed application of power to the various power operated means in a sequence causing preheating of the workpiece, movement of the tank into fluid applying relation with the workpiece, movement of the tank out of fluid applying relation with the workpiece and application of baking heat to the workpiece, all while continuously rotating said workpiece.

2. In an impregnating machine for a workpiece, the combination of workpiece supporting bearings, power operated driving means operably connected to the workpiece for rotation thereof in the supporting bearing, power operated heaters spaced adjacent the workpiece to heat a portion thereof uniformly upon rotation thereof, an impregnating fluid tank spaced adjacent the workpiece and mounted for movement into and out of fluid applying relation with a rotating heated portion of the workpiece to impregnate this portion uniformly, power operated means operably connected to the tank for moving it into and out of fluid applying relation, a source of power, power connections interconnecting the various power operated means and the power source and including time cycle power controlling means controlling timed application of power thereto in a sequence causing preheating of the workpiece, movement of the tank into fluid applying relation with the workpiece, movement of the tank out of fluid applying relation with the workpiece and the application of baking heat to the workpiece, all while continuously rotating said workpiece and additional power controlling means for said heaters acting in response to the temperature adjacent the heaters for reducing the power applied to certain of the heaters.

3. In an impregnating machine for an element of a dynamoelectric machine having insulated conductors contained in slots in a peripheral surface thereof, the combination of horizontally aligned bearings rotatably supporting the element, power operated driving means operably connected to the element to cause slow rotation thereof in the bearings, power operated jacking means below and between the bearings, a tank supported on the jacking means and containing heat drying insulation varnish and thinner and movable vertically into and out of fluid applying relation with the lower portion of the rotating machine element, a hood surrounding the machine element and tank, said hood having a plurality of power operated heaters, a power source, power connections including power connecting and disconnecting means interconnecting the power source and the various power operated means to rotate, preheat, varnish and bake the varnish applied to the peripheral surface of and insulated conductors in the dynamoelectric machine element and control connections including time cycle control means interconnecting the power connecting and disconnecting means to control the duration of rotation of the machine element and preheating, varnishing and baking of the varnish applied to said machine element while rotating.

4. In an impregnating machine for an element of a dynamoelectric machine having insulated electric conductors in a slotted peripheral surface thereof, the combination of horizontally aligned supporting bearings for the machine element, power operated jacking means located below and between the bearings, an impregnating tank containing heat drying insulating fluid varnish and thinner and movable by the power operated jacking means into and out of fluid coating relation with the lower portion of the machine element, a hood surrounding the machine element and tank, a plurality of power operated heaters uniformly spaced around the side and upper interior portions of the hood, temperature responsive power control means for the heaters located in the upper portion of the hood, power operated driving means operably connected to the machine element to slowly rotate the element on the supporting bearings, a power source, power connections interconnecting the various power operated means, the temperature responsive power controlling means for the heaters and the power source, and time cycle power controlling means connected in controlling relation with the power connections to control timed intervals of power application to the various power operated means in a sequence causing preheating of the rotor, movement of the tank into fluid coating relation with the rotor, movement of the tank out of fluid coating relation with the rotor and the application of baking heat to the coating applied to the rotor, all while continuously rotating said rotor.

5. In an impregnating machine for a cylindrical rotor of a dynamoelectric machine, the combination of horizontally aligned rotor supporting bearings, jacking means disposed between and below the bearings, an electric motor operably connected to the jacking means, springs supported on the jacking means, a tank supported on the springs, said tank having a dam adjacent each end, one dam having end positions at a higher level than the other dam and a central arcuate depression between the ends, a flexible seal in said depression resiliently retained in fluid sealing relation with the cylindrical surface of the rotor adjacent one end by the supporting springs and the tank ends and sides enclosing the lower portion of the rotor when the tank is fully elevated by the jacking means, a reservoir containing electrical insulating varnish including a thinner, a fluid heater, varnish circulating connections extending through the heater from the reservoir and including a pump and a flow control valve having an actuating element associated with the heater and acting upon the temperature of the fluid in the heater to maintain constant temperature of the varnish and thinner in the reservoir, a varnish supply connection connected between the reservoir and the tank intermediate the dams therein and including a second pump and an electric motor operated flow controlling valve, a drain connection interconnecting the reservoir and the tank at points outside each dam therein, an electric driving motor, speed reducing gearing operably connecting the driving motor and rotor to cause slow rotation thereof in the supporting bearings, a hood movable into enclosing relation with the rotor and tank, a plurality of electric heaters of the infrared type positioned within the hood, temperature responsive electrical switching means acting in response to temperature within the hood electrically connected to the heaters to deenergize certain of the electrical heaters upon a preselected rise in temperature in the hood, a source of electrical energy and electrical energizing connections including time cycle energizing control means interconnecting the electric motors, heaters and temperature responsive switching means to the energy source to control timed intervals of energization of the electrically operated means.

6. In an impregnating machine for a cylindrical rotor of a dynamoelectric machine the combination of horizontally aligned rotor supporting bearings, jacking means positioned below and between the bearings, an electrical motor operably connected to the jacking means, support springs on the jacking means, a tank supported on the springs, said tank having two transverse dams, each spaced from one end of the tank, one dam having end portions at a higher level than the other and a central arcuate depression intermediate the ends, a flexible seal secured in the central depression of the dam and retained in rotatable fluid sealing engagement with one end of the rotor by the tank supporting springs upon elevation of the tank by the jacking means, members secured to the bearing support members and positioned adjacent the tank, hinged tank covers pivotally connected to said members and movable out of covering relation by the tank upon elevation thereof by the jacking means, a reservoir containing impregnating heat drying varnish and a thinner, fluid circulating conduits connected externally with respect to the reservoir including a circulating pump, a heater and a flow valve acting in response to the temperature of the heater to maintain constant temperature of the varnish and thinner in the reservoir, a fluid supply conduit including a pump and an electric motor operated flow valve connected between the reservoir and the tank intermediate the dams therein, fluid drain conduits connected adjacent the ends of the tank and reservoir, speed reducing gearing operably connected to the rotor, an electric driving motor connected to the gearing for rotating the rotor slowly in the supporting bearings, a hood movable longitudinally into and out of enclosing relation with the rotating rotor and tank, said hood having a plurality of electric heating bulbs of the infrared type distributed uniformly on the insides and top of the hood, temperature responsive electric switching means for the bulbs in the hood for maintaining uniform temperature therein, a source of electric energy, energizing connections including adjustable time cycle energizing control means and manually operated starting means for the time cycle control means interconnecting the electric motors, electric heating bulbs and temperature responsive switching means therefor to control timed rotation, preheating and baking temperature of the rotor, and application of varnish and thinner thereto after preheating of the rotating rotor and before baking of the applied varnish and thinner.

7. In a machine for applying insulating varnish to a rotor of an electrical machine, the combination of bearings for supporting the rotor for rotation therein, means for rotating the rotor, heating means positioned around the sides and upper peripheral portion of the rotor when so supported, a tank for insulating varnish positioned below the rotor, means for raising said tank to a varnish applying position relative to the periphery of the rotor and to lower said tank, means for covering said tank when in its lowered position and means operable to remove said covering means during the raising of said tank and to replace said covering means during the lowering of said tank 8. In a machine for applying insulating varnish to a rotor of an electrical machine, the combination of bearings for supporting the rotor for rotation, means for rotating the rotor, heating means positioned around the sides and upper peripheral portion of the rotor when supported in said bearings, a varnish tank positioned below the rotor, means for raising said tank to a varnish applying position relative to the periphery of said rotor and to lower said tank, means movable with said tank controlling the flow of varnish into said tank, said tank having dams in said tank for maintaining a predetermined level of varnish in said tank and varnish drain connection, a tank cover, means operable during the raising of said tank to remove said cover and to replace said cover during the lowering of said tank and means operable during the raising of said tank to control the flow of varnish into said tank and operable during the lowering of said tank to discontinue flow of varnish into said tank.

9. In a machine for applying insulating varnish to a rotor of an electrical machine, the combination of bearings for supporting the rotor for rotation, means for rotating the rotor, heating means positioned around the sides and upper peripheral portion of the rotor when supported in said bearings, a varnish tank positioned below the rotor, means for raising said tank to a varnish applying position relative to the periphery of said rotor and to lower said tank, means movable with said tank controlling the flow of varnish into said tank, said tank having dams in said tank for maintaining a predetermined level of varnish in said tank and varnish drain connection, a tank cover, means operable during the raising of said tank to remove said cover and to replace said cover during the lowering of said tank and means operable during the raising of said tank to control the flow of varnish into said tank and operable during the lowering of said tank to discontinue flow of varnish into said tank, one of said dams in said tank engaging the periphery of said rotor when the tank is raised.

10. In a machine for applying insulation varnish to a rotor of an electrical machine, the combination of bearings for supporting the rotor for rotation therein, means supported adjacent one of said bearings and operable to rotate the rotor when supported in said bearings, a varnish tank located between said bearings and below said rotor, heaters spaced around the sides and upper peripheral portion of said rotor when supported in said bearings, means for raising said tank to a varnish applying position relative to the lower peripheral portion of said rotor and for lowering said tank, a varnish reservoir adjacent said tank, varnish supply and drain connections interconnecting said tank and said reservoir, said supply connection including a pump and a supply valve operable only during the raising of said tank to supply varnish thereto, varnish circulating connections connected to said reservoir, said circulating connections including a pump, varnish heating means and control means for said varnish heating means acting in response to the temperature of the varnish in said circulating connections to maintain a predetermined temperature of the varnish in said reservoir.

WILLIAM F. BELL.

REFERENCES CITED

The following references are of record in the file of this patent:

UNITED STATES PATENTS

| Number | Name | Date |
|---|---|---|
| 330,318 | Green et al. | Nov. 10, 1885 |
| 404,481 | Harris | June 4, 1889 |
| 595,808 | Goff | Dec. 21, 1897 |
| 695,986 | Wilson | Mar. 25, 1902 |
| 749,622 | Long | Jan. 12, 1904 |
| 752,768 | Goodwin | Feb. 23, 1904 |
| 834,249 | Beardslee | Oct. 30, 1906 |
| 2,288,585 | Partee et al. | June 30, 1942 |